J. W. STEVENS.
Lifting-Jacks.
No. 200,354.  Patented Feb. 12, 1878.
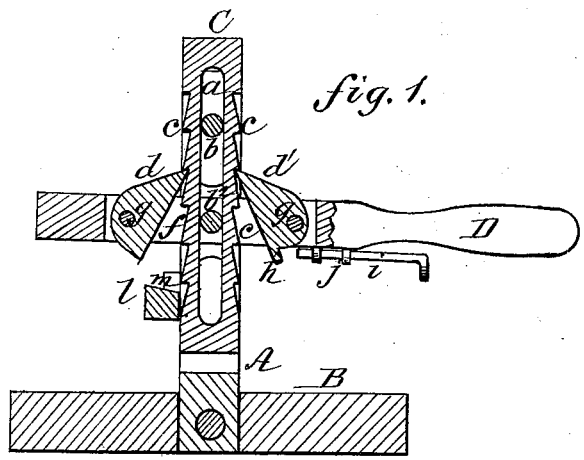
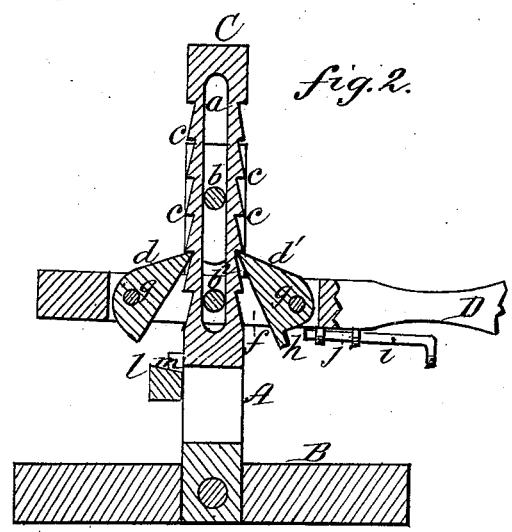
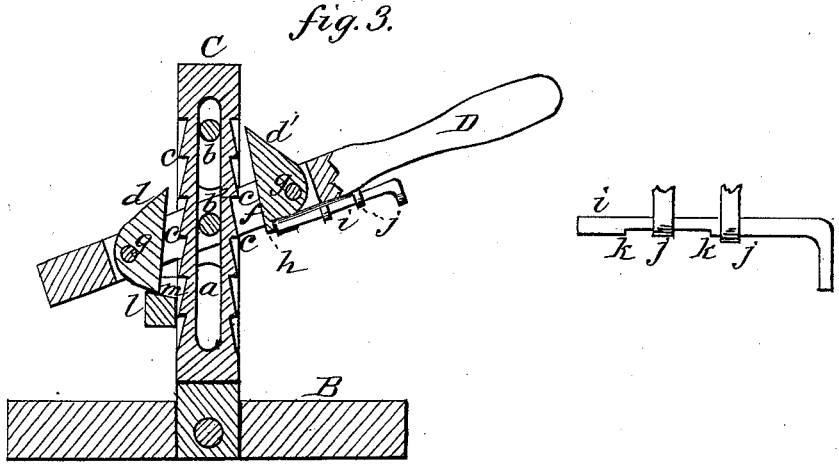
Witnesses:
Floyd Norris
D. P. Cowl
Inventor:
James W. Stevens
by Johnson & Johnson
Attys

UNITED STATES PATENT OFFICE.

JAMES W. STEVENS, OF ROUNDHEAD, OHIO.

IMPROVEMENT IN LIFTING-JACKS.

Specification forming part of Letters Patent No. 200,354, dated February 12, 1878; application filed July 18, 1877.

*To all whom it may concern:*

Be it known that I, JAMES W. STEVENS, of Roundhead, in the county of Hardin and State of Ohio, have invented certain new and useful Improvements in Lifting-Jacks, of which the following is a specification, reference being had to the accompanying drawings, in which—

Figure 1 represents a vertical section of a lifting-jack embracing my invention in position at rest; Fig. 2, a similar section, the bar being raised to support the axle or other body; and Fig. 3, a similar section, showing the lever raised and the bar down to lower the weight.

The object of my invention is to produce a jack combining quick action with a capacity to raise heavy weights, support them at any point, and to readily lower them.

I use a jack in which two standards, A, rise from a base, B, as usual, and carry a lifting-bar, C, a longitudinal slot, $a$, therein permitting it to rise and fall when operated, guided by cross-pins $b$ in the standards.

Ratchet-teeth $c\ c$ upon each side of the bar C are acted upon by dogs $d\ d'$ pivoted in the operating-lever.

The operating-lever D is fulcrumed, at $b^2$, between the standards, and has a vertical longitudinal slot, $f$, within which, upon both sides of the standards, are the dogs $d\ d'$, heretofore mentioned as engaging with the ratchets of the lifting-bar.

The dogs are pivoted at $g\ g$ eccentrically, and are of cam-like shape, whereby to fall into engagement by their own weight at the proper moment.

The dog $d'$ has a lower lip or projection, $h$, against which a push-bar, $i$, is forced to throw it out of engagement. This push-bar works in drop-eyes $j$ beneath the long arm of the lever, and is recessed or shouldered at $k\ k$, to hold it when adjusted and limit its inward and outward movement.

Upon that side of the standards from which the short arm of the lever projects, and at a suitable distance below it, is fixed to the standards a block, $l$, having an inclined bearing-surface, $m$, which receives the lower cam-arm of the dog $d$, which glides over said surface $m$ when the lever is raised to lower the weight by releasing said dog $d$ from the ratchets and permitting the bar to fall.

The operation of the jack is as follows: Being at rest, as shown in Fig. 1, with the push-bar $i$ disengaged from the dog $d'$, it is placed beneath the axle of a carriage, and the lever D is raised and lowered, during which movement the weighted dogs $d\ d'$ bite into the ratchets of the bar C, and lift it to the axle. Then one sweep of the lever clears the wheel of the ground, and holds it in that position. To let the wheel down, bear down on the lever sufficiently to release the dog $d'$ from the ratchet $c$; shove the push-bar $i$ against the lip $h$ of said dog, when the dog will be thrown backward clear of the beam; raise the lever until the dog $d$ strikes the block $l$ and glides over its bearing-surface $m$, when the dog $d$ is cleared and the bar drops.

The above description of jack is for use with carriages or wagons; and the standards, base, and lever are preferably of wood, and the bar, dogs, block, and push-bar of iron.

For lifting engines, houses, and very heavy weights, the lever should be iron, and socketed to receive any length of lever-handle.

The two weighted dogs form a very simple means of rapidly raising the bar and block in the standard, in connection with the dog released by the push-bar and lever, as simple and effective means for lowering it.

The dogs bear up against the ratchets of the bar, and thus gain strength and certainty of hold.

I claim—

1. The combination, with the dog $d$, carried by the lever, and the notched lifting-bar C, of the cross-piece $l$, fixed to the standard A in position to receive the lower point of said dog and turn its upper end out by the action of the lever, to lower said bar, as set forth.

2. A slotted lever, D, a push-bar carried thereby, a weighted dog, $d'$, provided with a projection, $h$, a dog, $d$, the block $l$, with its incline $m$, the ratcheted lifting-bar, and the standards, combined and operating substantially as described.

3. The double-rack lifting-bar C $c\ c$, having the vertical slot $a$, the standards A, having the guide cross-pins $b\ b^2$; and the lever D, pivoted upon one of said guide cross-pins $b^2$, and carrying the weighted dogs $d\ d'$, all constructed and adapted for operation as shown and described.

In testimony whereof I have hereunto set my hand in the presence of two subscribing witnesses.

JAMES W. STEVENS.

Witnesses:
S. W. NEVILLE,
J. C. BANNING.